US010549400B2

(12) United States Patent
Gerrath et al.

(10) Patent No.: US 10,549,400 B2
(45) Date of Patent: Feb. 4, 2020

(54) DEVICE AND METHOD FOR PROCESSING AN OPTICAL LENS

(71) Applicant: Schneider GmbH & Co. KG, Fronhausen (DE)

(72) Inventors: Torsten Gerrath, Fronhausen (DE); Stephan Huttenhuis, Fronhausen (DE); Gunter Schneider, Marburg (DE); Benjamin Schneider, Fronhausen (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 137 days.

(21) Appl. No.: 15/536,741

(22) PCT Filed: Dec. 19, 2014

(86) PCT No.: PCT/EP2014/003438
§ 371 (c)(1),
(2) Date: Jun. 16, 2017

(87) PCT Pub. No.: WO2016/095939
PCT Pub. Date: Jun. 23, 2016

(65) Prior Publication Data
US 2017/0348823 A1 Dec. 7, 2017

(51) Int. Cl.
*B24B 49/12* (2006.01)
*B24B 9/14* (2006.01)
(Continued)

(52) U.S. Cl.
CPC ............... *B24B 49/12* (2013.01); *B24B 9/14* (2013.01); *B24B 9/146* (2013.01); *B24B 9/148* (2013.01);
(Continued)

(58) Field of Classification Search
CPC ......... B24B 49/12; B24B 9/146; B24B 9/148; B24B 13/0055; B24B 41/004;
(Continued)

(56) References Cited

U.S. PATENT DOCUMENTS 4,662,119 A * 5/1987 Kojima ............... B24B 13/0037
451/159
5,454,194 A 10/1995 Gottschald
(Continued)

FOREIGN PATENT DOCUMENTS

CN 103084954 A 5/2013
DE 20022169 U1 9/2001

*Primary Examiner* — Eileen P Morgan
(74) *Attorney, Agent, or Firm* — David S. Safran; Roberts Mlotkowski Safran Cole & Calderon, P.C.

(57) ABSTRACT

A device and a method for processing, in particular edge processing, an optical lens, wherein the device has a measuring system, a processing system, a loading system, an unloading system, an intermediate conveyor, and a belt conveyor. The loading system is arranged between the measuring system and the processing system. The unloading system is arranged on the opposite side of the processing system. A lens that is to be processed is picked up and oriented at the optical reference point that is determined by the measuring system in order to determine as precisely as possible the blocking point for the subsequent processing. The loading system and unloading system each have a linearly movable swiveling system with linearly movable suction devices arranged therein. The processing system is designed for the simultaneous processing of two lenses.

4 Claims, 6 Drawing Sheets

(51) Int. Cl.
*B24B 13/005* (2006.01)
*B24B 27/00* (2006.01)
*B24B 41/00* (2006.01)

(52) U.S. Cl.
CPC ........ *B24B 13/005* (2013.01); *B24B 13/0055* (2013.01); *B24B 27/0069* (2013.01); *B24B 41/005* (2013.01)

(58) Field of Classification Search
CPC ....... B24B 41/005; B24B 9/14; B24B 13/005; B24B 27/0069
USPC .......................................... 451/6, 5, 43, 336
See application file for complete search history.

(56) References Cited

U.S. PATENT DOCUMENTS

| | | | |
|---|---|---|---|
| 6,379,215 B1 | 4/2002 | Mizuno et al. | |
| 6,623,339 B1* | 9/2003 | Igarashi | B23C 3/12 |
| | | | 451/42 |
| 6,974,363 B2* | 12/2005 | Werner | B24B 9/14 |
| | | | 451/384 |
| 7,766,723 B2 | 8/2010 | Mazoyer | |
| 8,944,315 B2 | 2/2015 | Schneider | |
| 2002/0034921 A1* | 3/2002 | Mizuno | B24B 9/14 |
| | | | 451/5 |
| 2006/0140731 A1* | 6/2006 | Yamamoto | B24B 9/146 |
| | | | 408/8 |
| 2009/0225274 A1* | 9/2009 | Krengel | B24B 9/148 |
| | | | 351/159.75 |
| 2013/0000499 A1* | 1/2013 | Ookubo | B24B 13/0055 |
| | | | 101/35 |
| 2015/0053530 A1* | 2/2015 | Schneider | B65G 37/02 |
| | | | 198/347.1 |
| 2018/0318978 A1* | 11/2018 | Schneider | B24B 13/0037 |

* cited by examiner

DEVICE AND METHOD FOR PROCESSING AN OPTICAL LENS

BACKGROUND OF THE INVENTION

Field of the Invention

This invention relates to a method for processing, in particular edge processing as well as a device for processing, in particular edge processing, an optical lens.

An optical lens, for example, for eyeglasses, is to have certain optical properties. The associated desired optical data of the lens are determined by, for example, an optician. The lenses are then processed or manufactured based on the optical data that are desired in each case, wherein the lenses have to be adapted in particular to the respective eyeglasses frame. This invention deals especially preferably with the edge processing of an optical lens for adapting to an eyeglasses frame.

Description of Related Art

European Patent Application EP 0 990 484 A1 and corresponding U.S. Pat. No. 6,379,215 B1, disclose a system for edge processing of lenses with a belt conveyor, a loading system, a measuring system, and a processing system. The loading system grips a lens that is to be processed by means of a loading arm with three suction devices and feeds the lens first to the measuring system. There the lens is held by the loading system and measured. Then, the lens is delivered directly to the processing system, where the lens first is placed on a lower clamping shaft and finally is clamped by means of an upper clamping shell as an opposing bearing for the processing. After the processing, the loading system picks up the processed lens by means of another suction device on an unloading arm in order to load, by swiveling, the processing system with the next lens that is to be processed. The known system is not optimized with respect to the course of the operation and a precise processing with high throughput.

European Patent Application EP 1 524 073 A2 and corresponding U.S. Pat. No. 6,974,363 B2, discloses a system for edge processing of eyeglass lenses, wherein a measuring system is arranged on the right and on the left next to a central belt conveyor on either side outside and wherein a processing system is arranged between the measuring system and the belt conveyor. The handling of the lens is done via a loading system, which alternately and as required by means of corresponding grippers or suction devices feeds the lenses to the individual systems on both sides. The known system is not optimized with respect to the course of action and a precise processing with high throughput.

SUMMARY OF THE INVENTION

The object of this invention is to indicate a method and a device for processing, in particular edge processing, an optical lens, wherein a compact design, an optimal course of the operation, a precise processing, i.e., a minimization of errors, and/or a high throughput is or are made possible or facilitated.

The above object is achieved by a method and a device according to the invention as described herein.

This invention relates to a method for processing, in particular edge processing, of an optical lens, wherein the lens—in particular, in a device with a measuring system and a processing system—is both measured and processed.

According to an especially preferred aspect of this invention, a method according to the proposal is distinguished in particular in that a point, in particular an optical reference point, is determined on the lens by means of an optical measurement; the lens is picked up or held at the determined point, and the lens then is oriented in a desired horizontal position or tilted position, in particular for another measurement or a subsequent processing. This is conducive to an especially precise measurement and determination of points as well as an especially precise holding of the lens and thus an especially precise processing.

The orientation of the lens in a desired horizontal position or tilted position is especially preferably carried out in that the tangential plane at the point at which the lens is held is oriented in a corresponding manner, for example perpendicular to a measuring axis or centering axis or rotational axis or the like. In particular, parallactic deviations during measurement can be minimized.

According to another aspect of this invention, a method according to the proposal is distinguished in particular in that in a first measurement, the optical reference point of the lens is determined in an approximate manner, then the lens is oriented in the thus determined optical reference point—in particular in its tilted position and/or in an optical axis of a measuring system—and then in a second measurement, the optical reference point is determined precisely or more precisely than in the first measurement. Preferably, the blocking point of the lens is then determined or calculated for the processing system. This allows for an especially precise determination of the blocking point and correspondingly an especially precise processing.

According to another aspect of this invention, a method according to the proposal is distinguished in particular in that after the measurement, the lens is delivered to an intermediate conveyor that loads and unloads the processing system with the lens or respectively two lenses and/or that operates independently from an upstream loading system and a downstream loading system. This allows for an optimized course of the operation, in particular since changing the grip on the lens can be minimized and since in the case of high throughput with a highly precise measurement, the structural cost can be kept comparatively small.

Preferably, after the—preferably approximate—determination of the optical reference point by means of the measuring system, the lens is gripped or held by means of the loading system and/or a second suction device and/or gripper in the optical reference point and is oriented in a desired horizontal position or tilted position, especially preferably so that the tangential plane at the optical reference point runs perpendicularly to the optical axis of the measuring system for a more precise measurement of the optical reference point. Then, the determination or calculation of the desired or ideal blocking point, in particular taking into consideration the shape and position of the lens after the edge processing and/or taking into consideration the properties of the processing system, can be carried out.

The lens is especially preferably picked up after the determination of the optical reference point by means of the measuring system on the calculated blocking point, preferably by means of a second suction device, and is oriented in a desired horizontal position or tilted position, especially preferably in such a way that the tangential plane at the blocking point runs perpendicular to the rotational axis of the lens in the subsequent processing. This orientation is carried out preferably using the second suction device and/or the loading system.

In addition, this invention also relates to a device for processing, in particular edge processing, of an optical lens. The device according to the proposal has a measuring system for the lens, a processing system, and a loading system. The actual processing, in particular, a block-free edge processing, is carried out in the processing system. The measuring system is used in particular for the determination or the measurement of an optical reference point of the lens, such as an optical center, a prism reference point, or the like, and for the determination or the calculation of a blocking point. Such a blocking point preferably lies closer in the area of a geometric center of the finished lens, i.e., the point depends in particular also on the respective eyeglasses frame and/or the physiognomy of the wearer/user, to which the lens is adapted by means of the preferred edge processing.

According to a preferred aspect of this invention, the loading system is preferably arranged between the measuring system and the processing system or is swivel-mounted there. This is conducive to a compact design, wherein a quick handling of the lens by the loading system—with traverse paths that are as short as possible and as a result a higher throughput—is made possible.

According to another aspect of this invention, the loading system is preferably designed for holding and/or gripping the lens and subsequent orientation in a desired horizontal position or tilted position in order to determine the optical reference point and the blocking point. This makes possible an especially precise measurement or determination of the optical reference point as well as the blocking point and thus an especially precise processing of the lens.

According to another aspect of this invention, the loading system is preferably designed for holding and in particular orienting the lens at a point that is determined by means of the measuring system, in particular at a thus determined optical reference point, and for the subsequent orientation of the lens in a desired horizontal position or tilted position. This is conducive to an especially precise measurement and determination of points and thus also to an especially precise processing.

According to another aspect of this invention, the loading system is preferably designed for holding and in particular orienting the lens at an optical reference point that is determined by means of the measuring system and then at a blocking point that is determined by means of the measuring system. Consequently, an especially precise measurement and holding of the lens and thus an especially precise processing are made possible.

According to a preferred aspect of this invention, the device is preferably designed in such a way that the lens is fed to the measuring system, the optical reference point of the lens is determined—preferably iteratively—by means of the measuring system, and the blocking point is determined or calculated, in particular wherein in a first measurement, the optical reference point of the lens is determined—preferably approximately; the lens is then oriented in particular by means of the loading system at the determined optical reference point; and in a second measurement, the optical reference point of the lens—in particular in the oriented tilted position or horizontal position of the lens—is determined precisely or more precisely. This is conducive to a highly specific handling, measurement and processing, in particular since the ideal blocking point is determined or calculated especially precisely and/or the lens can be gripped or clamped as precisely as possible—i.e., with minimization of measuring errors—at the ideal blocking point for the processing of the lens.

According to another aspect of this invention, the device preferably has an unloading system that works independently of the loading system for removal or depositing of a processed lens. This is conducive to a quick and optimized course of the operation, in particular to be able to use the loading system for various holding processes during measurement and at the same time to make possible a high number of cycles and/or a high throughput. Consequently, this aspect is also conducive to a precise processing and a quick course of the operation.

As an alternative, the loading system can also take over the function of the unloading system and/or can form the latter. The unloading system can thus also be omitted.

Preferably, the device or processing system according to another aspect of this invention has—in addition to the loading system and in particular in addition to the unloading system—an intermediate conveyor for receiving lenses that are to be processed from the loading system and feeding to the processing system as well as for removal of processed lenses from the processing system. This makes possible an optimized loading and unloading process, in particular since a change of the gripping both in the loading system and in the unloading system can be omitted or can be used both for the loading and for the unloading. This is conducive to an optimal course of the operation and an optimal design and/or a defined or high-precision transfer, in particular when the intermediate conveyor for a lens has only one movement axis.

As an alternative, the intermediate conveyor can also be omitted, and the loading system can load the processing system directly with lenses or then unload the lenses. Correspondingly, the unloading device, if present, can directly unload the processing system when the intermediate conveyor is omitted, i.e., it can remove or carry away processed lenses from the processing system.

It is to be noted that in the case of this invention, the procedure is preferably implemented in a block-free manner. Thus, no so-called block piece is fastened to the lens that is to be processed. Nevertheless, the term "blocking point" is used to refer to the reference point for the clamping in the processing.

Individual previously-mentioned and subsequent aspects and features of this invention can be combined with one another in any way desired, but they can also be implemented independently of one another.

Other aspects, features, advantages, and properties of this invention will be apparent from the following description of a preferred embodiment in conjunction with the accompanying drawings.

DETAILED DESCRIPTION OF THE INVENTION

In the figures, the same reference numbers are used for the same or similar components and systems, wherein the same or corresponding advantages and properties follow, even when a repeated description is omitted.

The subject of the invention is a device 1 and a method for processing, in particular edge processing, an optical lens 2, in particular for adapting the lens 2 to an eyeglasses frame, not shown.

The lens 2 preferably consists of plastic. However, in principle, another material that is to be processed in a suitable way, optionally also glass or mineral glass, can also be used. If the finished lens 2 is used or is to be used for eyeglasses (not shown), which preferably is the case, the lens 2 is also referred to as an eyeglass lens, even when the lens 2 optionally does not consist of glass.

Figure 1:
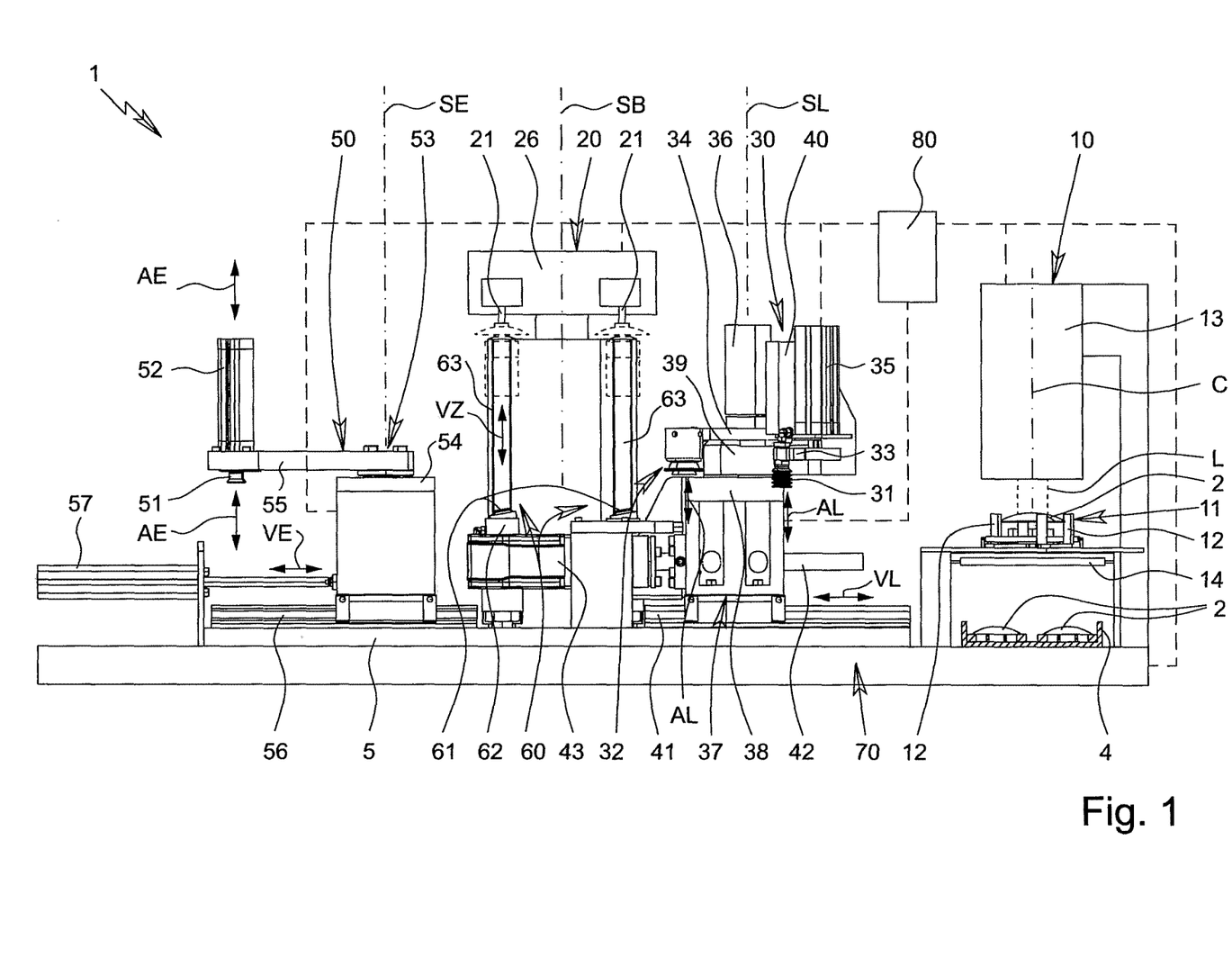
FIG. 1 shows a diagrammatic side view of a device according to the proposal.
Figure 2:
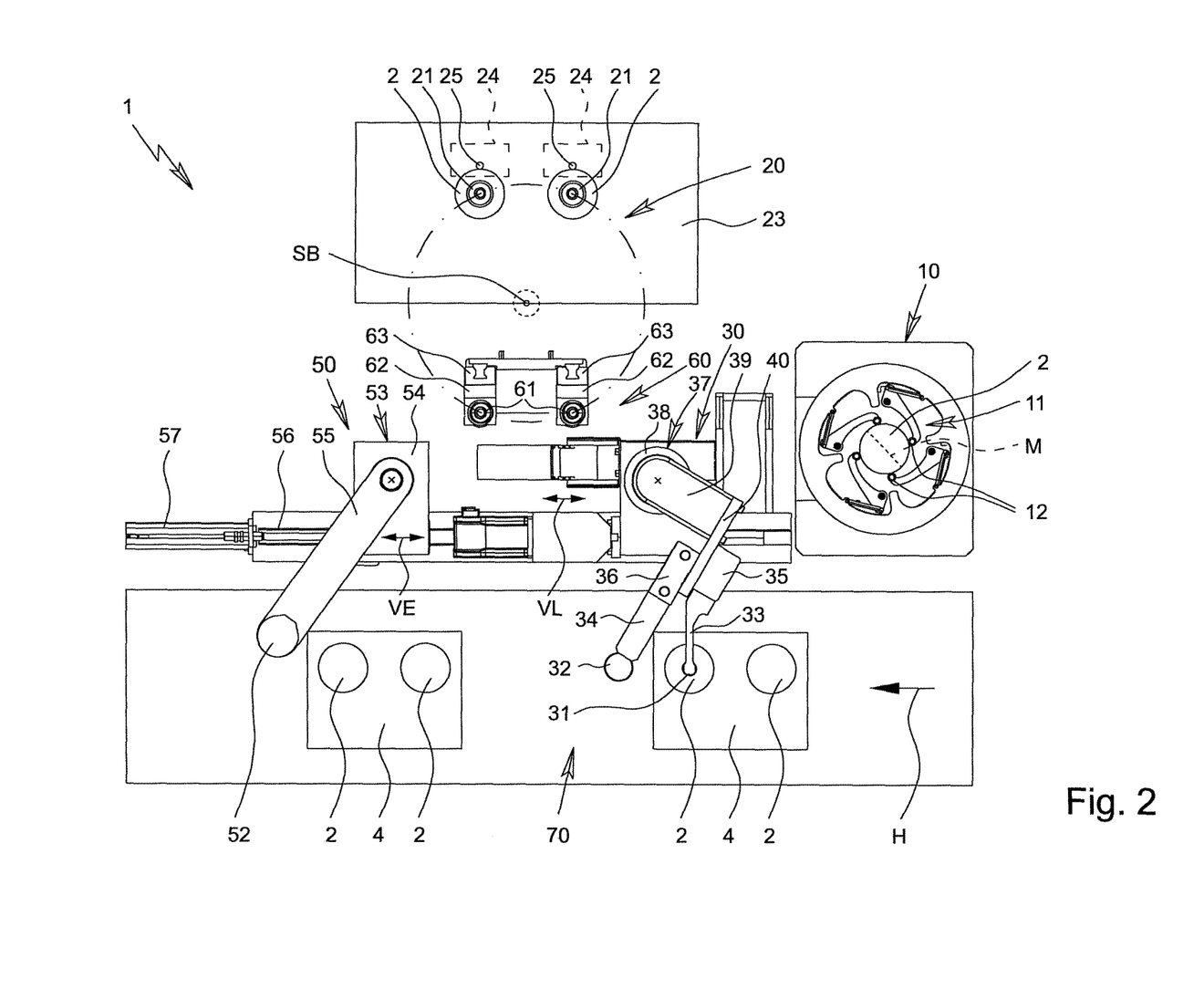
FIG. 2 shows a diagrammatic top view of the device.
Figure 3:
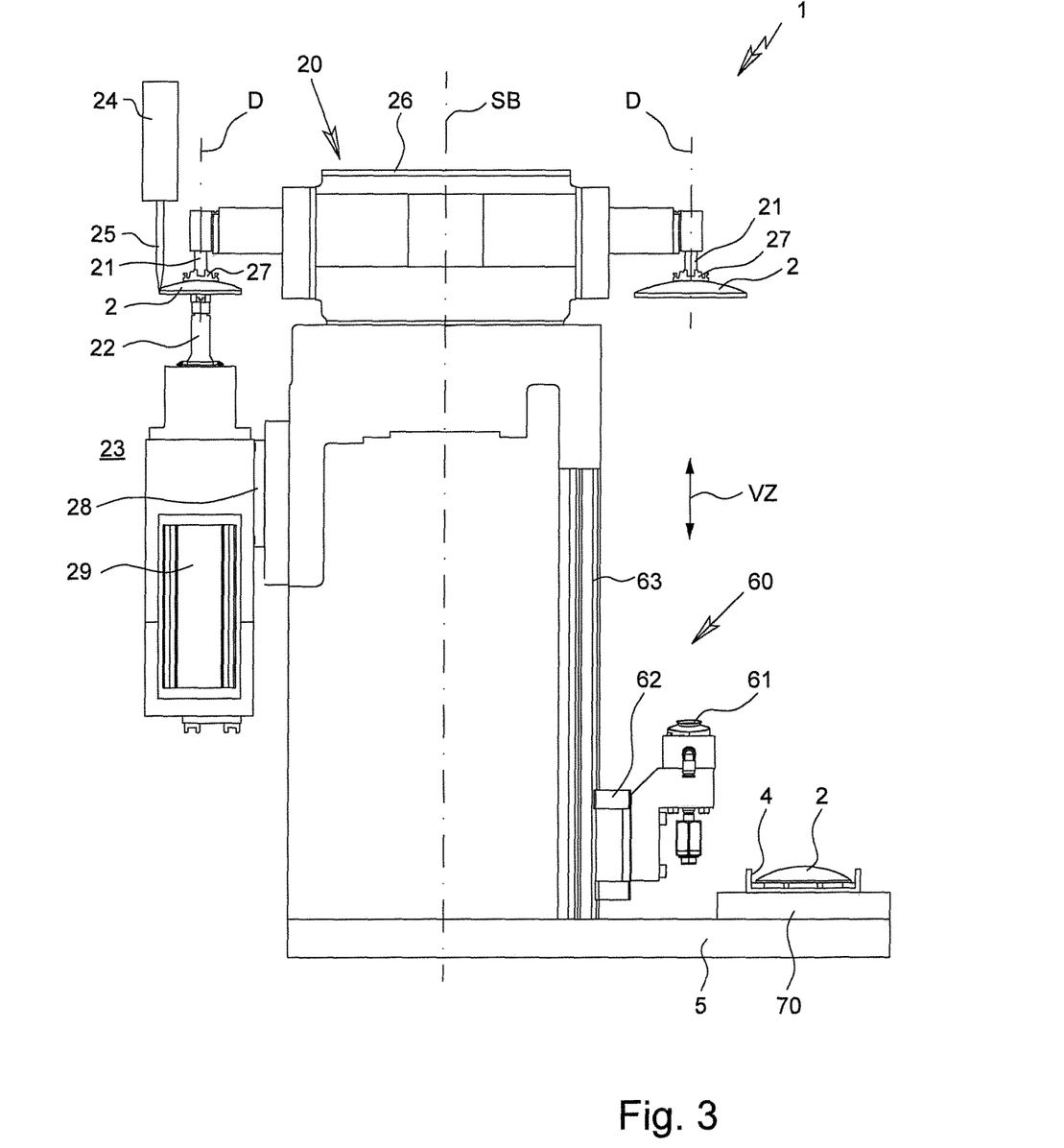
FIG. 3 shows a diagrammatic section of the device.

FIG. 1 shows a preferred embodiment of the device 1 according to the proposal in a diagrammatic side view. FIG. 2 shows the device 1 in a diagrammatic top view. FIG. 3 shows the device 1 in a diagrammatic, very simplified section.

The device 1 has a measuring system 10, a processing system 20, and a loading system 30, as well as preferably an unloading system 50, an intermediate conveyor 60, a lens conveyor 70, and/or a control system 80.

The measuring system 10 is used for an optical measurement of the lens 2 that is to be processed. Preferably, the measuring system 10 is used in the determination, in particular the measurement and/or calculation, of an optical reference point O, a blocking point B, and/or an orientation (rotating position) of the lens 2, as diagrammatically indicated in FIG. 4.

Figure 4:
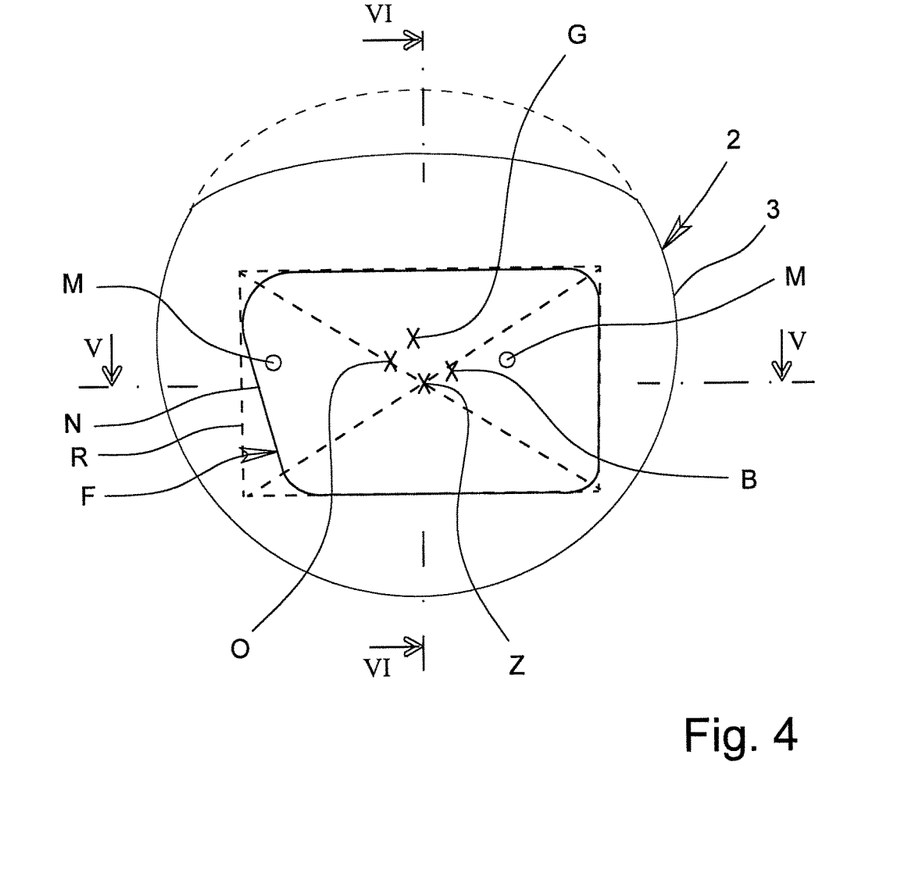
FIG. 4 shows a diagrammatic top view of a lens and a desired lens shape.
Figure 5:
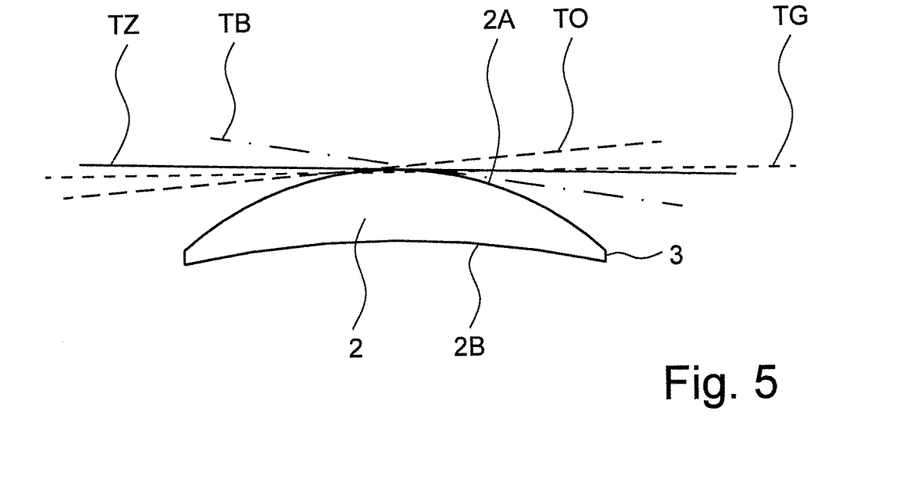
FIG. 5 shows a diagrammatic section of the lens according to FIG. 4 in the plane V-V.
Figure 6:
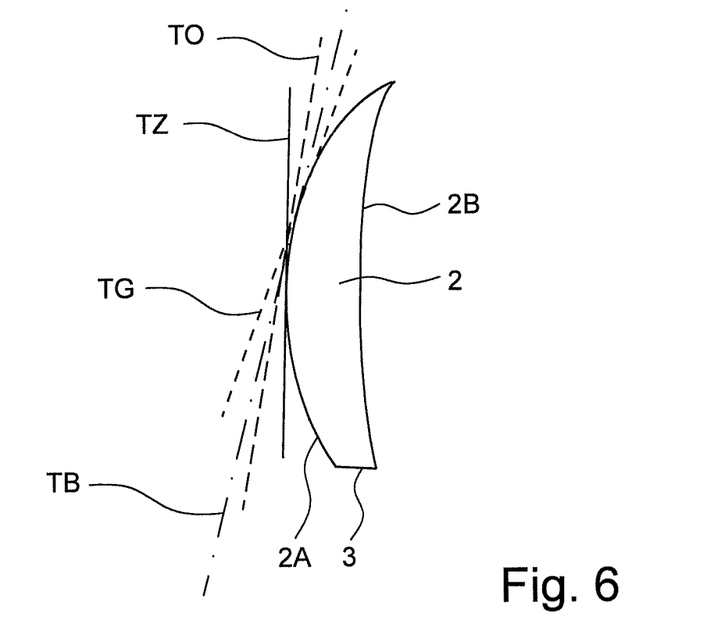
FIG. 6 shows a diagrammatic section of the lens according to FIG. 4 in the plane VI-VI.

In a diagrammatic top view, FIG. 4 shows a lens 2 that is to be processed and/or a lens blank. In an only-diagrammatic section along line V-V of FIG. 4, FIG. 5 shows the lens blank or the lens 2 before the edge processing, wherein various tangential planes T on the front side 2A of the lens 2 are indicated. FIG. 6 shows a diagrammatic section, corresponding to FIG. 5, along line VI-VI of FIG. 4.

Preferably, the lens 2 that is to be processed or a lens blank is at least essentially circular, and/or the lens 2 that is to be processed or the lens blank has an at least essentially circular outside contour. In particular, an edge 3 of the lens 2 that is to be processed is at least essentially circular. Other geometries or outside contours are also possible, however.

The lens 2 that is depicted in FIG. 4 has an outside contour that deviates from the circle, and/or an edge 3 that deviates from the circle. The circle is indicated by broken lines.

In the illustrative example, the lens blank or the lens 2 that is not processed deviates from the circle, depicted in broken lines, in particular because of its design in the upper edge area, which is partially sharply contoured by way of example.

The geometric center G of the lens 2, indicated in FIG. 4, preferably relates to a circular lens 2 or to a circular edge 3. In particular, the geometric center G of the lens 2 is the center of the lens 2 that would result when assuming an at least essentially circular geometry of the lens 2 or a circular edge 3, even when the lens 2 does not have a circular shape.

Consequently, the geometric center G can deviate from the actual central point and/or center of gravity.

In FIG. 4, a shape F of the lens 2 is indicated, which is the shape to be received, after processing, by the lens 2 that is to be processed or by the lens blank, in order to be fit into or to be accommodated in an assigned (not shown) eyeglasses frame. This shape F is achieved or produced by corresponding processing or edge processing of the lens 2 in the processing system 20. This is done in particular by the corresponding finishing or removal of areas of the edge 3 of the lens 2, especially preferably by machining or grinding, milling, turning and/or in another suitable way.

The position of the shape F of the processed lens 2 depends on the optical reference point, which can be defined in particular as the "optical axis" of the lens 2. Specifically, the optical reference point O is usually to have a determined position in the finished lens 2 in order to be able to reach, for the user or eyeglasses wearer, the correct position of the lens 2 in the eyeglasses frame and thus relative to the user's eye.

Consequently, it is first important to determine the optical reference point O and in particular also the accompanying rotating position of the lens 2 or the lens blank in the case of rotationally-asymmetrical lenses 2—here by means of the measuring system 10—in order to be able then to define, on this basis, the position of the shape F of the finished lens 2, which also depends in particular on the respective eyeglasses frame, in the lens blank for the subsequent edge processing—here in the processing system 20.

In the case of the edge processing or edge working, the lens blank is clamped at the blocking point B. The latter is determined or calculated or established in particular based on the position of the lens shape F—optionally also taking into consideration other aspects, such as desired or necessary cut-outs, holes, or the like. This is carried out in particular by means of the measuring system 10, the control system 80, and/or taking into consideration manual or other inputs or specifications, such as the size and/or shape of abutting elements, which clamp the lens 2 or the lens blank for the processing.

Preferably, the lens 2 has a frame center Z. The frame center Z preferably corresponds at least essentially to a geometric center of the desired lens shape F or a—theoretical or usually assumed to be rectangular—frame R, which reframes or encompasses the shape F of the lens 2, as illustrated by broken lines in FIG. 4. The frame center Z can correspond to a center of the shape F or can approximate the latter.

The depicted shape F, for example, has a recess on the side that faces the nose bridge of a user (not shown) or on the nasal side N, so that the frame center Z optionally deviates from the center of the shape F.

The blocking point B can be identical to the frame center Z or—in particular taking into consideration recesses or cut-outs, as for the nasal side N, holes, or the like—the point can deviate therefrom. In principle, it is also possible that the blocking point B corresponds to the optical reference point O or the geometric center G of the lens 2 or the lens blank.

Preferably, the blocking point B—taking into consideration the frame center Z, the contour or the size and the position of the desired lens shape F and/or holes, cut-outs, or the like, and preferably taking into consideration requirements of the processing system 20, such as the size and/or shape of clamping elements for holding the lens 2, or requirements of the processing—is specified or determined in order to make possible in particular as central a clamping for the processing as possible and/or to minimize moments that arise during processing and that act in the lens plane.

FIG. 4 also indicates the optical reference point p that corresponds to the optical axis of the lens 2, in particular on a flat side, in particular the front side 2A, of the lens 2. Here it is noted that the optical reference point O can be different from the geometric center G of the lens 2 that is to be processed.

The optical reference point O depends in particular on what type or what kind of lens 2 is involved. This can then also have a corresponding effect on the measurement in the measuring system 10 or the determination of the optical reference point O. For example, the position of the optical reference point O or its determination depends on whether a rotationally symmetrical or single-vision lens 2, a bifocal lens 2, a progressive lens 2, a so-called free-form lens 2, or the like is involved.

For example, in the case of a single-vision lens or bifocal lens, the optical reference point O can be determined by means of an optical projection in the measuring system 10 in order to determine in particular the rotating position of the lenses 2 in the case of non-rotatory or rotationally asymmetrical lenses 2.

In the case of a progressive lens or free-form lens, markings M, as indicated in FIG. 4, are often used, which have, for example, a predetermined distance, usually 34 mm, and usually a predetermined shape, for example a circle here, in order to set the optical reference point O—here in particular as a geometric center between the two markings M—and in particular also to indicate the rotating position of the lens 2—here in particular by the connecting line of the two markings M.

The precision of the determination of the optical reference point O depends in particular on the centering of the lens 2 or the lens blank in the measurement or in the measuring system 10 and/or the orientation of the tilted position of the lens 2 in the measurement or in the measuring system 10. In particular, the measurement or determination of the optical reference point O can be imprecise, when the lens 2 is poorly centered and/or is tilted relative to the optical measuring axis or central axis C (see FIG. 1) of the measuring system 10.

In the depicted example, the geometric center G, the frame center Z of the optical reference point O, and/or the blocking point B are separated from one another or are different. FIGS. 5 and 6 illustrate that because of the geometry or surface curvature of the lens 2, in particular the front side 2A, the respectively assigned tangential planes TG, TB, TZ and TO are also inclined differently toward one another. The tangential plane TG is the plane that rests tangentially on the geometric center G; the tangential plane TB is the plane that rests tangentially on the blocking point B; the tangential plane TZ is the plane that rests tangentially on the frame center Z; and the tangential plane TO is the plane that rests tangentially on the optical reference point O.

The determination of the desired blocking point B is preferably done by means of the measuring system 10 and/or the control system 80.

The device 1 or measuring system 10 is preferably adapted to determine the orientation or rotating position and/or the geometry, in particular the contour or the edge 3, of the lens 2. This is done in particular by detecting one or more markings M, as indicated by way of example in FIG. 4. These markings M, if present, are also especially preferably used in the determination of the optical reference point O, as already explained.

The measuring system 10 preferably has a holding system, in particular a gripper 11, for holding the lens 2 during measurement. In the illustrative example, the holding system or the gripper 11 preferably has retaining fingers 12 that can rest—in particular by spring force—laterally against the lens 2, as indicated in FIGS. 1 and 2. However, other design approaches are also possible.

The measuring system 10 preferably has a measuring device 13 for optical measurement or gauging of the lens 2 and optimally a light source 14 for illuminating the lens 2. Especially preferably, the holding system or the gripper 11 holds the lens 2 between the light source 14 and the measuring device 13 for measuring or during the measuring. The measuring can be carried out in particular based on projection, transmission, and/or reflection using light, such as visible light, laser light, UV light, or the like.

The processing system 20 is used in the processing, in particular the edge processing, of the lens 2. In particular, the processing system 20 is designed for simultaneous processing of two lenses 2, preferably a right and left lens 2 for an eyeglasses frame, not shown.

Below, primarily the processing of a lens 2 is explained, even if—as stated—preferably a processing of two lenses 2 that occurs simultaneously and independently is carried out or is possible.

The processing is carried out in a shaping manner, in particular for achieving the desired shape F of the lens 2, as indicated in FIG. 4.

The processing system 20 also preferably allows for a desired processing of an edge 3 of the lens 2, in particular, if necessary, the forming of bezels, grooves, and/or the like.

The processing system 20 is preferably designed for block-free processing of the lens 2. In particular, no so-called block piece—i.e., no holding device—is temporarily glued to the lens 2 or applied integrally in some other way. Instead, the lens 2 is preferably clamped for processing.

The processing system 20 preferably has an upper clamping shaft 21 and a lower clamping shaft 22 in order to clamp the lens 2 that is to be processed in between, as indicated in FIG. 3.

In the illustrative example, the processing system 20 is designed for simultaneous processing of two lenses 2. Consequently, the processing system 20 here preferably has two upper or one pair of upper clamping shafts 21 and two lower or one pair of lower clamping shafts 22 for simultaneous clamping of two lenses 2. FIG. 3, however, shows only the processing of one lens 2.

The processing is done preferably in a working space 23 of the processing system 20, preferably wherein two upper clamping shafts 21 and two lower clamping shafts 22 are arranged in the working space 23 in order to be able to clamp and to process in particular two lenses 2 at the same time.

The processing system 20 preferably has a tool drive 24 with at least one preferably exchangeable tool 25 for processing a lens 2. Especially preferably, the processing system 20 has two tool drives 24 that work independently of one another, with assigned tools 25 for independent and simultaneous processing of two lenses 2. FIG. 3 shows an already processed lens 2 in the working space 23 of the processing system 20.

Preferably, the respective tool drive 24 can be moved—in particular starting from the frame 5—over a horizontal axis, vertical axis, and/or a preferably horizontal swivel axis—i.e., with multiple axes or with three axes, in order to make possible the desired processing, taking into consideration the rotational axis D of the respective lens 2.

The upper clamping shafts 21 are preferably held by a swiveling or rotatable head or mounting 26, wherein the mounting 26 can be swiveled or rotated around a swivel axis SB in order to be able to swivel the upper clamping shafts 21 out from and back into the working space 23 to change the lens 2.

In particular, in the case of a swiveling of the mounting 26 by 180° from the working position, the upper clamping shafts 21 adopt a changing position outside of the working space 23, as FIGS. 1 to 3 illustrate.

The processing system 20 or the mounting 26 preferably has four upper or two pairs of upper clamping shafts 21, which can be swiveled alternately in the working space 23 in order to make possible a respective processing of two lenses 2 in each case, while the other pair of clamping shafts 21 can release the processed lenses 2 and can receive new lenses 2 that are to be processed, i.e., can carry out in parallel an unloading and a loading. In particular, the processing system 20 makes possible the simultaneous handling of four lenses 2, preferably wherein two lenses 2—preferably simultaneously—are processed, and two lenses 2—preferably simultaneously—can be released and/or received.

The upper clamping shafts 21 are each rotatable around a rotational axis D and are preferably equipped with an own (not shown) rotary drive.

The upper clamping shafts 21 are preferably provided each with a holding device, in particular suction devices 27, for holding the assigned lens 2.

The upper and lower clamping shafts 21, 22 can be clamped against one another in the working space 23 in order to clamp the respective lens 2 that is to be processed in between. In the illustrative example, preferably only the lower clamping shafts 22 can be shifted or moved linearly or against the respectively assigned upper clamping shaft 21 and can be moved away again therefrom. In the illustrative example, this is preferably carried out by corresponding carriage guides 28. However, other design approaches are also possible.

The lower clamping shafts 22 are arranged in the working space 23 each coaxially to an assigned upper clamping shaft 21 and can be rotated together with the latter for the corresponding processing of the lens 2. Preferably, the lower clamping shafts 22 can be driven to this end via corresponding drives 29, in particular rotary drives, in particular synchronously to the respectively assigned upper clamping shaft 21.

The loading system 30 is adapted to receive a lens 2 that is to be processed from the lens conveyor 70, in particular from containers 4 with the lenses 2, and the feeding of the lens(es) 2 that is/are to be processed to the measuring system 10 and/or processing system 20.

The loading system 30 has a first gripper, in particular a suction device 31, and preferably also a second gripper, in particular a suction device 32. Since the grippers are preferably designed as suction devices, reference is always made to suction devices below. The embodiments in this regard apply in a corresponding manner, however, if instead a gripper or some other holder is used for the first and/or second suction devices 31, 32.

The first suction device 31 is preferably arranged on or held by a first loading arm 33 and/or a first linear drive, in particular a pneumatic cylinder 35, of the loading system 30.

The second suction device 32 is preferably arranged on or held by a second loading arm 34 and/or a second linear drive, in particular a pneumatic cylinder 36, of the loading system 30.

The loading system 30 preferably has a swiveling system 37, which carries in particular the first and second suction devices 31, 32 or the first and second loading arms 33, 34 and/or the first and second linear drives and/or pneumatic cylinders 35, 36, in particular in a swiveling manner.

The swiveling system 37 preferably has a swivel drive 38 and a swivel arm 39 that can swivel thereon. However, other design approaches are also possible.

In the illustrative example, the linear drives or pneumatic cylinders 35, 36 are preferably connected via a holding element 40 to the swivel arm 39, wherein the linear drives and/or pneumatic cylinders 35, 36 for their part carry the loading arms 33, 34 with the suction devices 31, 32. However, other design approaches are also possible.

The swiveling system 37 and/or the swivel drive 38 and/or swivel arm 39 can preferably be moved or shifted in a linear manner in a shifting direction VL, in particular by means of a corresponding carriage guide 41 and/or motor-driven threaded spindle 42 of the loading system 30. Preferably, the threaded spindle 42 is driven by an assigned motor 43. However, another actuating drive can also be provided for the desired linear movement in the shifting direction VL.

Preferably, the loading system 30 is arranged between the measuring system 10 and the processing system 20 or is mounted in a swiveled manner there. This is conducive in particular to a very compact design and/or short traveling distance.

The unloading system 50 is used in the removal or depositing of a processed lens 2. In particular, the unloading system 50 places the processed lenses 2 again in corresponding containers 4—in particular so-called "trays"—after the processing. The lenses 2 that are to be processed had been removed in advance from the containers 4—in particular by means of the loading system 30.

The unloading system 50 preferably has a gripper, in particular a suction device 51. Since preferably a suction device is used for gripping or holding the processed lens 2, only the suction device 51 is explained in greater detail below. However, instead, this can also be a gripper or the like, so that in this case the subsequent embodiments and explanations apply accordingly.

The suction device 51 is preferably held in a linearly adjustable manner by a linear drive, in particular a pneumatic cylinder 52.

The unloading system 50 preferably has a swiveling system 53, here in particular with a swivel drive 54 and a swivel arm 55. The swivel arm 55 preferably carries the suction device 51 or linear drive/pneumatic cylinder 52. However, other design approaches are also possible.

The swiveling system 53 or the swivel arm 55 or swivel drive 54 can preferably be moved or shifted linearly in a shifting direction VE, in particular by means of a corresponding carriage guide 56 and/or an assigned actuating drive 57. However, other design approaches are also possible.

Especially preferably, the unloading system 50 is arranged on a side of the processing system 20 that faces away from the measuring system 10 and/or loading system 30, or is swivel-mounted there. This is conducive to a compact design and/or a short traveling distance.

Especially preferably, the loading system 30 and the unloading system 50 are arranged on the side that faces away from the working space 23 and/or on the side of the processing system 20 that faces the lens conveyor 70.

Especially preferably, the measuring system 10, the loading system 30, the processing system 20, and the unloading system 50 are arranged at least essentially in a row or behind one another and/or on a side next to the lens conveyor 70.

The intermediate conveyor 60 is preferably used for a receiving of lenses 2 that are to be processed from the loading system 30 and a feeding of these lenses 2 to the processing system 20 as well as a removal of processed lenses 2 from the processing system 20 and a preparation of these lenses 2 for the unloading system 50.

In the illustrative example, the intermediate conveyor 60 preferably has a gripper, in particular a suction device 61, for gripping or holding the lens 2, in particular on a reverse side 2B of the lens 2, and preferably a linear drive or carriage 62 for linear movement or shifting of the gripper/suction device 61.

Especially preferably, the intermediate conveyor 60 is designed for the receiving or removal and preparation or transfer of pairs of lenses 2. Consequently, the intermediate conveyor 60 in the illustrative example preferably has two suction devices 61 at assigned carriages 62, which can preferably be moved parallel to one another.

Preferably, the carriages 62, and thus the suction devices 61, can be moved or shifted linearly in a shifting direction VZ into two carriage guides 63 by means of assigned (not shown) drives, as indicated in FIGS. 1 and 3.

Especially preferably, the suction devices 61 can be moved or shifted by means of the linear drives or carriages 62 against the assigned upper clamping shafts 21 that are located in the change position, as indicated by broken lines in FIG. 1, in order to deliver processed lenses 2 to the latter or to transfer processed lenses 2 from the latter.

The lens conveyor 70 is adapted to convey lenses 2 that are to be processed, in particular from corresponding containers 4, and/or to convey away processed lenses 2, in particular into corresponding containers 4.

The lens conveyor 70 is preferably designed as a floor conveyor, in particular a belt conveyor or a band conveyor.

The lenses 2 or containers 4 can be conveyed by means of the lens conveyor 70, preferably at least essentially horizontally and/or linearly and/or laterally along the device 1 in a main conveying direction H.

The loading system 30 is preferably used in a removal of the lenses 2 that are to be processed from the conveyor 70 or from the corresponding containers 4.

Preferably, each container 4 contains one pair of lenses 2, in particular a right and left lens 2, for eyeglasses, not shown, or an eyeglasses frame, not shown.

The lens conveyor 70 is preferably arranged on one side of the device 1 and/or is extended at least essentially over the entire length or width of the device 1.

The swivel axis SL of the loading system 30 or swiveling system 37 preferably runs at least essentially vertically and/or perpendicular to the main conveyor direction H and/or beside the lens conveyor 70.

The same preferably applies for the swivel axis SE of the unloading system 50 or the swiveling system 53 thereof.

The linear axis or movement axis AL of the loading system 30 and/or the suction devices 31, 32 preferably corresponds in each case to a central axis and/or the movement axis AL runs at least essentially vertically, parallel to the swivel axis SL and/or perpendicular to the shifting direction VL.

The linear or movement axis AE of the unloading system 50 and/or the linear drive and/or pneumatic cylinder 52 thereof preferably corresponds to a central axis and/or runs at least essentially vertically, parallel to the swivel axis SE and/or perpendicular to the shifting direction VE.

The movement axis or shifting direction VL of the loading system 30 or for the swiveling system 37 thereof preferably runs at least essentially horizontally and/or parallel to the main conveying direction H and/or perpendicular to the swivel axis SL.

The same preferably applies for the movement axis or shifting direction VE of the unloading system 50 or the swiveling system 53 thereof, in particular wherein the shifting direction VE runs perpendicular to the swivel axis SE.

Preferably, the movement axes or shifting directions VL and VE run parallel or in a row.

Preferably, the linear axes or movement axes AL of the two linear drives or pneumatic cylinders 35, 36 of the loading system 30 run at least essentially parallel to one another.

Preferably, the loading arms 33, 34 of the loading system 30 extend at least essentially in a swivel plane relative to the swivel axis SL and/or in a plane of the swivel arm 39 and/or angled or at least essentially crosswise to the swivel arm 39.

Preferably, the two loading arms 33, 34 of the loading system 30 are separated from one another in the area of their free ends or suction devices 31, 32 held by them. In particular, the loading arms 33, 34 run at least essentially in a V shape from one another.

Preferably, the two linear drives or pneumatic cylinders 35, 36 can be controlled or actuated independently of one another. However, as an alternative, a combined movement of the two loading arms 33, 34 and/or the two suction devices 31, 32 is also possible in particular by means of only one linear drive or pneumatic cylinder 35 or 36 in the direction of the movement axis AL.

Preferably, the rotational axis D of the processing system 20 or clamping shafts 21, 22 and/or the swivel axis SB of the processing system 20 runs or run at least essentially vertically and/or parallel to the swivel axis SL and/or SE of the loading system 30 and/or unloading system 50.

Preferably, the rotational axis/axes D and the swivel axis SB run parallel to one another.

Preferably, the linear axis or shifting direction VZ of the intermediate conveyor 60 runs at least essentially vertically and/or parallel or coaxially to the rotational axis D of the processing system 20 or upper clamping shafts 21.

Preferably, the measuring axis or central axis C of the measuring system 10 runs at least essentially vertically.

Preferably, the movement axis AL of the loading system 30 runs parallel to the measuring axis or central axis C of the measuring system 10 and/or to the rotational axis D of the processing system 20.

Preferably, the gripper 11 of the measuring system 10 is arranged at least essentially at the same height as the intermediate conveyor 60 and/or its suction device 61 and/or carriage 62 in the lowered position or in the position that is shown in FIG. 1.

The device 1 preferably has a frame 5, which carries the measuring system 10, the processing system 20, the loading system 30, the unloading system 50, the intermediate conveyor 60, the lens conveyor 70, and/or the control system 80.

Especially preferably, the carriage guide(s) 28, 41, 56 and/or 63 is or are connected to the frame 5 or carried by the latter.

The control system 80 is used in particular for a control of the measuring system 10, processing system 20, loading system 30, unloading system 50, the intermediate conveyor 60, and/or the lens conveyor 70.

Preferably, the control system 80 can provide the necessary data for the desired shape F of the respective lens 2, for example by a request from a corresponding database, a computer system, or a corresponding scanner or reading device for detecting the shape of an eyeglasses frame or the like. Optionally, the measuring system 10 can also serve or be used to detect the shape of an eyeglasses frame for determination of the desired lens shape F.

Preferably, in particular also the optical data of the lens 2 in the case of the final establishment of the lens shape F or its position on the lens 2 are taken into consideration in particular by the device 1, the measuring system 10 and/or the control system 80, in addition to the lens shape F that is necessary for the respective eyeglasses.

Below, various aspects of this invention, the device 1 according to the proposal and the method according to the proposal are explained in more detail.

The lens conveyor 70 conveys the lenses 2 that are to be processed to the device 1. In particular, the lenses 2 are conveyed in the containers 4 (trays).

Figure 7:
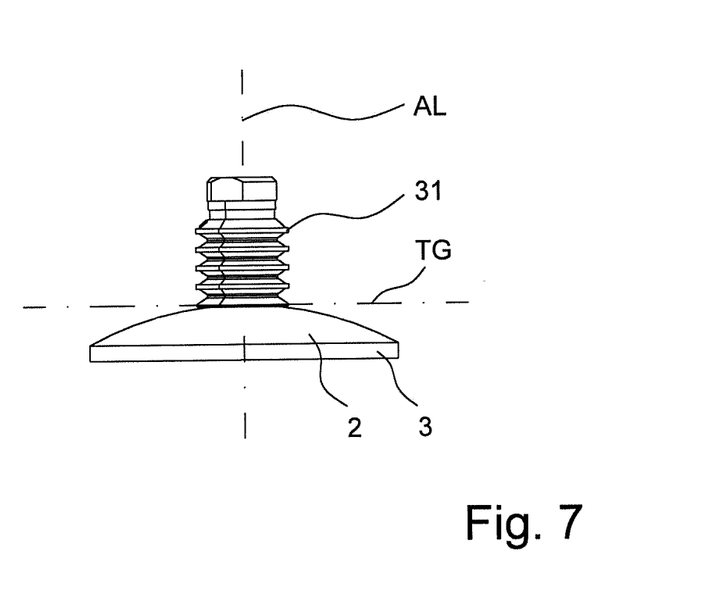
FIG. 7 shows a diagrammatic depiction of a gripping of the lens at an optical reference point.

The loading system 30 grips the lenses 2 that are to be processed preferably individually, in particular first by means of the first suction device 31, as depicted in FIG. 7. It is also possible, however, that the loading system 30 grips the lenses 2 by means of the (second) suction device 32 in the containers 4 and conveys them to the measuring system 10, in particular when the loading system 30 has only one single suction device.

The loading system 30 grips or holds the lens 2 first with the first suction device 31. This is carried out in particular by corresponding shifting in the shifting direction VL, swiveling around the swivel axis SL, and/or lifting or lowering in the direction of the movement axis AL.

The loading system 30 delivers the lens 2 to the measuring system 10, in particular to the gripper 11 thereof.

The loading system 30 or the first suction device 31 or the second suction device 32 is moved out again from the measuring system 10 and/or the measuring area for the light L (cf. FIG. 1) in order to make possible a (first) measurement or gauging of the lens 2, in particular the outside contour of the lens 2 or of the edge 3. It is also possible, however, that a (first) measurement or gauging of the lens 2 is carried out, without the loading system 30 or the (first) suction device 31 being moved out again from the measuring system 10 or the measuring area for the light L, and/or that the loading system 30, in particular the first suction device 31, holds (still) the lens 2 during measurement or gauging of the lens 2, in particular as described below for the subsequent centering step.

The gripper 11 is designed in such a way that it holds the lens 2 in the position and orientation delivered by the loading system 30. This is achieved in particular by a spring-loaded abutting or some other abutting of the retaining finger 12 on the edge 3 of the lens 2. However, other design approaches are also possible.

In the (first) measurement or gauging, preferably the edge 3 or the outside contour of the lens 2 is detected and/or the geometric center G of the lens 2 is determined.

Preferably, the lens 2 is then centered, in particular in the previously-determined geometric center G, preferably in such a way that the geometric center G is at least essentially in the central axis C or the central axis C runs through the geometric center G.

Preferably, in a subsequent centering step, the lens 2, for centering, is released or disengaged from the gripper 11 and moved by means of the loading system 30, in particular of the first suction device 31, in such a way that the lens 2 is oriented or centered relative to the measuring system 10.

In the case of the orientation, in addition or as an alternative to the centering, optionally also a tilting of the lens 2 in a horizontal position or a desired tilted position can be carried out, in particular so that the tangential plane at the point at which the loading system 30 engages or at the determined geometric center G runs at least essentially horizontally and/or perpendicular to a measuring axis or centering axis C. This can be carried out by, for example, optional changing of the grip and/or by corresponding design of the suction device 31 or use of the suction device 32.

Especially preferably, the lens 2, at the geometric center G that is determined by means of the measuring system 10, is thus delivered by means of the loading system 30 to the measuring system 10, and/or gripped in a centered manner by the gripper 11.

Preferably or optionally, the optical reference point O is then determined, preferably iteratively, in particular first approximately in a first step and then precisely or more precisely in a second step.

Especially preferably, the loading system 30, in particular the first suction device 31 and/or the second suction device 32, is or are moved out again from the measuring system 10 or the measuring area to determine the optical reference point O.

The measurement or determination of the optical reference point O can be carried out in the case of a spherical surface, for example, by a vertex power measurement or optical projection, such as points on a defined circle. In the case of other surfaces, in particular so-called free-form surfaces, multifocal lenses, or the like, this can be more difficult, wherein, for example, the markings M can be detected and used for determining the optical reference point O, if present. Depending on requirements, for example, the control system 80 can make available necessary information and data to the measuring system 10, and/or the control system 80 can take these data into consideration in the evaluation and determination of the optical reference point O.

After the preferred first or approximate determination of the optical reference point O, the lens 2 is preferably gripped once more, namely at—in particular determined in an approximate manner—the optical reference point O, in particular by the loading system 30, especially preferably by means of the second suction device 32.

Especially preferably, the lens 2 is held at the optical reference point O that is determined by means of the measuring system 10 and then oriented in a desired horizontal position or tilted position in order to make possible an optional second determination or more precise determination of the optical reference point O. The second measurement in the horizontal position or desired tilted position makes possible the minimization of measurement errors, in particular the minimization of a possible parallactic deviation, so that the second measurement makes possible a more precise determination of the optical reference point O than the first measurement.

After the lens 2 is gripped by the (second) gripper or suction device 32, the gripper 11 of the measuring system 10 is opened, and the lens 2 is oriented in a desired horizontal position or tilted position—preferably by means of the second suction device 32—in particular so that the tangential plane TO at the optical reference point O runs at least essentially horizontally and/or perpendicular to the central axis C.

The loading system 30 or its (second) suction device 32 is preferably designed in such a way that the lens 2 can be oriented in the desired horizontal position or tilted position, in particular so that the lens 2 that is gripped at the (approximately or in the first step) determined optical reference point O can be oriented or tilted with its tangential plane TO at this point, in particular horizontally and/or perpendicular to the central axis C. This orientation is later carried out once more after the lens 2 is gripped at the blocking point B, so that reference can be made to the subsequent explanations in this regard—in particular in connection with FIGS. 8 and 9—that apply in particular corresponding to the orientation of the lens 2 at the determined optical reference point O.

After the desired orientation of the tilted position and/or in particular the renewed centering of the lens 2, the latter is picked up again by the gripper 11 and held in the desired (new) orientation and/or position.

The loading system 30 or the first suction device 31 or the second suction device 32 is then moved away again from the measuring system 10 or moved out from the measuring area.

The optional (second) measurement or gauging of the lens 2 is then carried out for a more precise determination of the optical reference point O. In this connection, it is to be taken into consideration that the lens 2 was oriented in advance at the measured optical reference point O in its tilted position, in particular so that the tangential plane TO at the measured optical reference point O runs horizontally and/or perpendicular to the central axis C. Consequently, an especially precise or error-free (second) determination of the optical reference point O is made possible. The determination of the optical reference point O preferably also accompanies the determination of the rotating position of the lens 2, i.e., the rotational orientation, even if the latter is not further explained. The information on the position of the optical reference point O therefore also contains in particular information on the rotating position of the lens 2 and is taken into consideration in a corresponding manner, in particular in the determination of the position of the lens shape F and in the determination of the blocking point B, even if this is not explained in more detail.

The reference point O that is determined in the first measurement and the reference point O that is determined in the second measurement can be different, i.e., can be spaced apart, but can also optionally be identical. Normally, the first determined optical reference point O (potentially) is somewhat further away from the actual optical reference point O of the lens 2 than the afterwards determined (more precise) optical reference point O. These potentially different points are not shown separately in FIG. 4 and are also not referred to in a different way.

Preferably, after the (more precise or repeated) determination of the optical reference point O, the blocking point B is determined, in particular calculated, wherein the especially precisely determined optical reference point O as well as the other parameters, such as the desired lens shape F and its position relative to the optical reference point O, are taken into consideration.

The determination of the blocking point B, which is preferably carried out simultaneously or after the establishment of the position of the desired lens shape F on the lens 2, can preferably be performed or supported by the measuring system 10 and/or control system 80.

Preferably, the lens 2 is gripped and oriented, after the blocking point B is determined, in the blocking point B by means of the loading system 30, in particular the second suction device 32. In particular, the lens 2 is oriented at the blocking point B in such a way that the tangential plane TB at the blocking point B runs horizontally and/or perpendicular to the central axis C.

Figure 8:
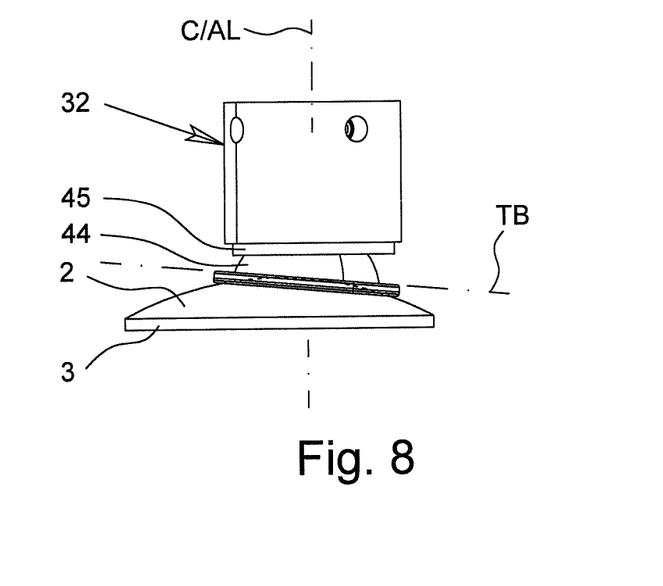
FIG. 8 shows a diagrammatic depiction of a gripping of the lens at a blocking point.
Figure 9:
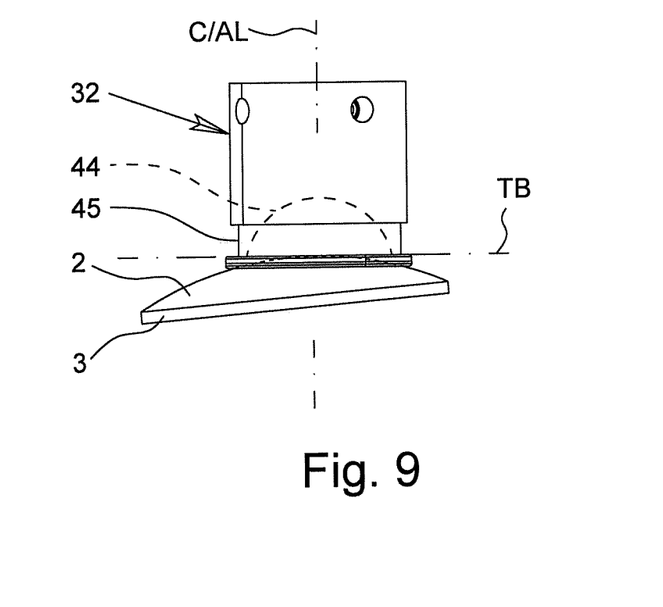
FIG. 9 shows a diagrammatic depiction corresponding to FIG. 8, wherein the lens is oriented with its tangential plane horizontally at the blocking point.

In FIGS. 8 and 9, it is diagrammatically shown how in particular the tangential plane TB at the blocking point B here is preferably oriented horizontally, in particular by means of the second suction device 32. It is also possible, however, that the lens 2 is gripped and oriented by means of the first suction device 31 at the blocking point B.

Especially preferably, the lens 2 is held in succession, first at the optical reference point O determined by means of the measuring system 10 and then at the calculated blocking point B, by the loading system 30, especially preferably by the same (second) suction device 32.

The loading system 30 preferably picks up the lens 2 with the second suction device 32 at the optical reference point O and at the blocking point B, in order to orient the lens 2 in each case in the desired horizontal position or tilted position. It is also possible, however, that the first suction device 31 orients the lens 2 at the optical reference point O and/or at the blocking point B. Below, the orientation of the lens 2 at the blocking point B by means of the second suction device 32 is to be explained based on FIGS. 8 and 9. The orientation of the lens 2 is preferably carried out at the optical reference point O by means of the second suction device 32 at least essentially in the same way or a similar way.

The second suction device 32 is preferably designed as a pendulum suction device. It preferably has an in particular dome-shaped suction element 44, which can also lie in a desired way inclined on the surface of the lens 2, as diagrammatically indicated in FIG. 8 and FIG. 9.

When the blocking point B is eccentric and/or deviates from the optical reference point O, the tangential plane TB can then consequently be inclined, in particular relative to the movement axis AL of the loading system 30 and/or the second suction device 32 and/or to the measuring axis or central axis C, as indicated by way of example in FIG. 8. The suction element 44 can be placed correspondingly inclined on the lens 2, as FIG. 8 indicates.

After the lens 2 is gripped or held at the blocking point B, the gripper 11 is opened, and the loading system 30 can convey the lens 2 to the processing system 20 or to the optional intermediate conveyor 60.

Preferably, after the gripping or holding on the blocking point B, the lens 2 is oriented in a desired tilted position or horizontal position, especially preferably in such a way that the tangential plane TB at the held or determined blocking point B runs at least essentially horizontally and/or perpendicular to the movement axis AL and/or central axis C and/or subsequent rotational axis D in the case of the processing.

In the illustrative example, the orientation is preferably carried out in such a way that the suction element 44 is oriented by means of an orienting element 45, such as, for example, an orienting sleeve, in the above-mentioned desired way. In particular, the orienting element 45 is displaced relative to the suction element 44 in such a way that the suction element 44 is tilted or swiveled in the desired orientation or (back) into a normal position, as indicated in FIG. 9.

The above-mentioned orientation of the suction element 44 is easily possible in particular because of the preferably circumferential collar of the suction element 44, which comes to rest on the front surface of the orienting element 45 in order to produce the desired orientation. However, other designs are also possible.

After the determination of the blocking point B and orientation of the lens 2 at the blocking point B, the lens 2 is fed to the processing system 20 or the upstream intermediate conveyor 60. This is preferably carried out by means of the loading system 30 or the second suction device 32.

The lens 2 that is oriented in its tilted position in the above-mentioned manner is then delivered in particular to the intermediate conveyor 60 or to a suction device 61 of the intermediate conveyor 60.

It is to be noted that in particular, design approaches are also possible in which the loading system 30 has only one suction device, preferably wherein the suction device performs the described method steps and/or has the described aspects, properties, features and/or advantages of the first suction device 31 and/or the second suction device 32 or combines those.

The intermediate conveyor 60 is preferably designed in such a way that the tilted position is maintained exactly, and that the lens 2 can then be ultimately delivered at this tilted position to the processing system 20, or more precisely to the assigned upper clamping shaft 21 in the change position.

In the illustrative example, the suction device 61 of the intermediate conveyor 60 is preferably designed as a so-called pendulum suction device, i.e., provided in particular with a suction element, which preferably can be tilted corresponding to the suction element 44, but its tilted position is maintained after the suctioning.

After the first of a pair of lenses 2 has been delivered to the intermediate conveyor 60, the loading system 30 proceeds accordingly with the second corresponding lens 2, takes the latter from the container 4 and feeds it first to the measuring system 10 for corresponding measurement and determination first of the optical reference point O and then of the blocking point B. This is done in particular as already described.

Then, this second lens 2 in turn is fed to the intermediate conveyor 60, delivered in particular to the suction device 61 at or in the desired tilted position or orientation.

Especially preferably, the lens 2 is thus delivered after the measurement to the intermediate conveyor 60, which loads and unloads the processing system 20 with the lens 2, respectively, two lenses 2, and/or works independently of the upstream loading system 30 and the downstream unloading system 50. This is conducive to an optimized course of the operation and/or a minimization of grip-changing.

It is noted that the measuring system 10 preferably also determines in each case the orientation or rotating position of the respective lens 2. This rotating position is preferably delivered in a defined way to the processing system 20 or to the intermediate conveyor 60. Consequently, the respective rotating position of the lens 2 can be—and in particular is—taken into consideration in the processing. For example, the upper clamping shafts 21 can be correspondingly rotated or rotationally oriented before the respective lens 2 is gripped. In principle, the suction devices 31, 32, 51 and 61 preferably cannot rotate, in particular in order to maintain the rotating position of the lens 2—even when the lens 2 tilts.

A special advantage of the device 1 according to the proposal and the method according to the proposal lies in the fact that no orientation has to be carried out in a determined rotating position, i.e., the lens 2, for example in the measuring system 10, does not have to be rotated, but rather the lenses 2 can have any rotating position and this arbitrary rotating position is determined and is taken into consideration in the further processing—for example by rotating the suction device 27.

It is also noted that design approaches are also possible in which two lenses 2 can be handled at least essentially simultaneously by means of the loading system 30, i.e., the loading system 30 takes two lenses 2 from the container 4 at the same time, feeds the lenses 2 simultaneously to one or more, in particular two, measuring systems 10 for measuring and determining the respective optical reference point O and the respective blocking point B, and then simultaneously delivers them to the intermediate conveyor 60, preferably each at or in the desired tilted position or orientation.

After the loading of the intermediate conveyor 60 or the two suction devices 61 with the lenses 2 that are to be processed, the delivery to the processing system 20 or the assigned upper clamping shafts 21 is carried out. To this end, carriages 62 are run in the shifting direction VZ or from the position shown in FIG. 1, upward against the clamping shafts 21. The clamping shafts 21 grip or hold the lenses 2 then by means of corresponding suction devices 27, wherein the previous orientation or tilted position and/or rotating position of the lens 2 is maintained. After this loading, the intermediate conveyor 60 and/or the carriages 62 are again run downward or moved away from the delivered lenses 2.

Then, after finishing the lenses 2 that are normally already located in the working space 23, a change of the processed lenses 2 from the working space 23 into the change position and vice versa of the lenses 2 that are to be processed from the change position into the working space 23 can be carried out. This is carried out especially preferably by corresponding rotating or swiveling of the head part or mounting 26 of the processing system 20.

After changing the lenses 2, the processing of the new lenses 2 can be carried out in the working space 23. The lower clamping shafts 22 are preferably run via corresponding carriage guides 28 and assigned (not shown) drives against the upper clamping shafts 21 or the lenses 2 that are held thereon, so that the latter are correspondingly clamped in between, as indicated in FIG. 3 for one of the upper clamping shafts 21 and one of the lower clamping shafts 22.

Then, the processing, in particular edge processing, is carried out, in a desired way, wherein the tool drive 24 can be moved with the assigned tool 25 preferably in several axes in order to make it possible to carry out the desired processing.

In addition, a tool change is preferably carried out if necessary, wherein the tool change is carried out in particular in an automated way.

While the processing in the working space 23 is carried out, the already processed lenses 2, which are now located in the change position, i.e., on the side of the lens conveyor 70, are unloaded and/or are put back onto the lens conveyor 70.

For unloading, the processed lenses 2 are preferably again transferred from the intermediate conveyor 60 by having the carriages 62 be run upward and the processed lenses 2 be gripped with the suction devices 61. The lenses 2 are then moved away from the upper clamping shafts 21 and in particular moved downward. There, the lenses 2 are then preferably gripped individually by the unloading system 50, in particular by means of the suction device 51, and put back into a corresponding empty space in a container 4, preferably into the same space and in the same container 4 from which the lens 2 was earlier removed. However, other approaches are also possible, in particular in which the lenses 2 are gripped simultaneously by the unloading system 50.

Especially preferably, the respective container 4 is provided specifically with an information medium, such as an RFID chip, bar code, a plug-in card, or the like, in order to identify the lenses 2 and/or the respective instructions or to make them identifiable, or optionally also to provide corresponding processing data.

After the unloading system 50 has removed the processed lenses 2 from the intermediate conveyor 60, the loading system 30 can again convey or deliver the next lenses 2 that are to be processed to the intermediate conveyor 60 after the corresponding measuring and gripping at the blocking point B—as already described.

Preferably, for suctioning and holding the lenses 2, the suction devices or the corresponding suction elements are placed under negative pressure in each case by means of corresponding systems (not shown) and are aerated again to release the lens 2 if necessary or optionally may even be supplied with a slight overpressure.

The control system 80 preferably controls the entire course of the operation and/or the method according to the proposal.

If necessary, the device 1 and/or the control system 80 can access additional external data, such as necessary processing data, data relating to the frame or the desired lens shape F or other data information.

Individual aspects and features of the above-mentioned course of the operation and/or of the device 1 according to the proposal and/or of the method according to the proposal can also be implemented independently of one another and in any combination, even if described together as a whole based on the described, especially preferred embodiment.

What is claimed is:

1. Method for edge processing an optical lens in a device, wherein the lens is both measured and processed in the device, the method comprising:

delivering the lens from a lens conveyor to a measuring system in which the lens is measured;

after measuring the lens, removing the lens from the measuring system with a loading system which is located on a first side of a processing system, delivering the lens from the loading system to an intermediate conveyor, the intermediate conveyor being operated independently of the loading system;

feeding the lens to the processing system with the intermediate conveyor;

edge processing the lens in the processing system;

using an unloading system arranged on an opposite side of the processing system from the loading system for removal of a processed lens from the processing system and for delivery of the processed lens to the lens conveyor; and operating the unloading system independently of both the loading system and the intermediate conveyor.

2. Method according to claim 1, wherein, multiple lenses are processed simultaneously in the processing system.

3. Method according to claim 1, wherein a blocking point of the lens is determined and after the determination of the blocking point, the lens is oriented and delivered to the intermediate conveyor.

4. Method according to claim 1, wherein the processing system has a rotatable mounting with multiple rotatable clamping shafts for simultaneous handling of multiple lenses, and wherein the intermediate conveyor delivers the lens to one of the clamping shafts.

* * * * *